(No Model.)

L. EDMISTON.
COMBINED WASHER AND NUT LOCK.

No. 474,821. Patented May 17, 1892.

Witnesses:
A. W. Paff.
John H. Davis

Inventor:
Leslie Edmiston

UNITED STATES PATENT OFFICE.

LESLIE EDMISTON, OF BANGOR, PENNSYLVANIA.

COMBINED WASHER AND NUT-LOCK.

SPECIFICATION forming part of Letters Patent No. 474,821, dated May 17, 1892.

Application filed March 14, 1892. Serial No. 424,910. (No model.)

*To all whom it may concern:*

Be it known that I, LESLIE EDMISTON, a citizen of the United States, residing at Bangor, in the county of Northampton, State of Pennsylvania, have invented a new and useful Combined Washer and Nut-Lock, of which the following is a specification.

My invention relates to an elastic washer that will always bear against the nut and prevent it from working loose by vibration, especially adapted to the bolts of railroad fish-plates. I attain this object by the mechanism illustrated by the accompanying drawings, in which—

Figure 1:
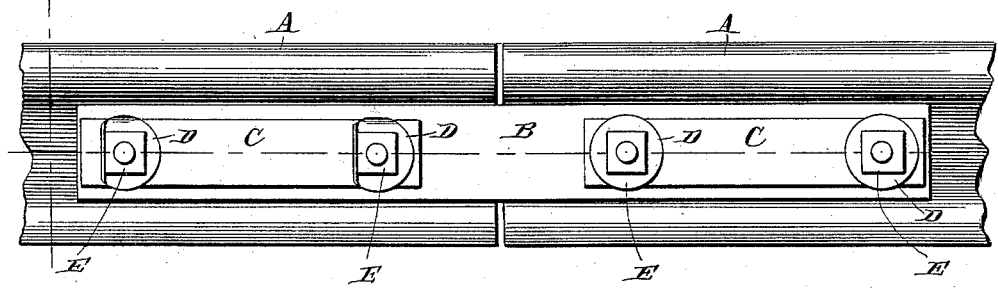
Figure 2:
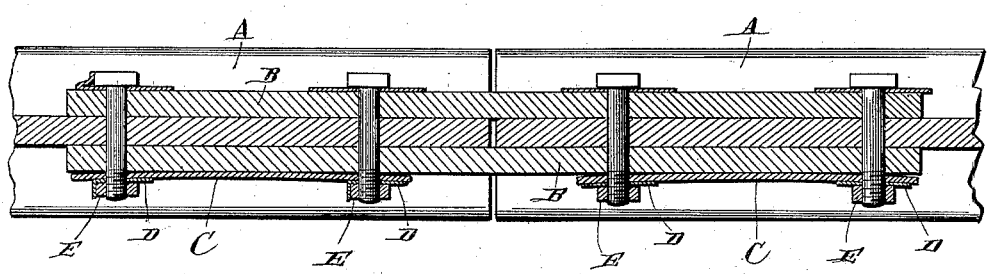
Figure 3:
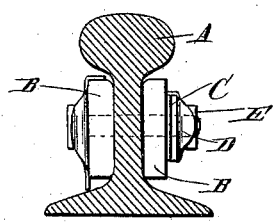
Figure 4:
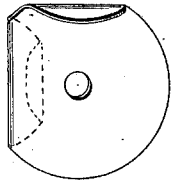
Figure 5:
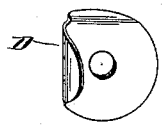

Figure 1 is a view of my combined washer and nut-lock applied to a fish-plate. Fig. 2 is a horizontal section through Fig. 1. Fig. 3 is an end view of Fig. 1. Figs. 4 and 5 are detailed views of the washer.

The ordinary rails A are connected by fish-plates B of any form in which common bolts are used.

C is a flat piece of steel or elastic metal wide enough to receive a hole near each end and the same size and distance apart as the holes in the rail and fish-plate. This is to be made with such a curve that when placed with the convex side toward the work the nuts will draw the ends down and form a rigid joint. In case of vibration the elasticity of the spring-washer C will come into action. The washer D is of thin metal a little larger in diameter than the spring-washer C is in width. After the nut is screwed home as much of the washer D as projects over the edge of the spring-washer C is hammered down over the said edge, and at any other part as much of it as is not covered by the nut E is bent up against any side of the nut. Thus neither the flexible washer or nut can go round until forced by a wrench. If the bolts be not provided with such bearings as to prevent them from turning, I propose to secure them by the heads in the same manner.

What I do claim as my invention, and desire to secure by Letters Patent, is—

The combination of one or more bolts passing through a curved spring-washer, a flexible washer and square or polygon nut thereon, the flexible washer being between the base of the nut and the spring-washer and having one edge turned down over the edge of the spring-washer and another edge turned up against the side of the nut, substantially as set forth.

Bangor, Pennsylvania, February 6, 1892.

LESLIE EDMISTON.

Witnesses:
JOHN H. DAVIS,
ALFRED M. PAFF.